US010459515B2

(12) United States Patent
Matsuda (10) Patent No.: US 10,459,515 B2
(45) Date of Patent: Oct. 29, 2019

(54) INFORMATION PROCESSING APPARATUS AND NON-TRANSITORY COMPUTER-READABLE RECORDING MEDIUM HAVING STORED THEREIN PROGRAM FOR SETTING CONNECTION INFORMATION

(71) Applicant: Fujitsu Client Computing Limited, Kanagawa (JP)

(72) Inventor: Mitsumasa Matsuda, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 128 days.

(21) Appl. No.: 15/484,511

(22) Filed: Apr. 11, 2017

(65) Prior Publication Data

US 2017/0300106 A1   Oct. 19, 2017

(30) Foreign Application Priority Data

Apr. 14, 2016   (JP) ................................. 2016-081349

(51) Int. Cl.
| | |
|---|---|
| *G06F 1/32* | (2019.01) |
| *G06F 1/3287* | (2019.01) |
| *G06F 1/24* | (2006.01) |
| *G06F 9/4401* | (2018.01) |
| *H04W 48/00* | (2009.01) |
| *G06F 1/3203* | (2019.01) |

(52) U.S. Cl.
CPC .............. *G06F 1/3287* (2013.01); *G06F 1/24* (2013.01); *G06F 9/4403* (2013.01); *G06F 9/4411* (2013.01); *H04W 48/17* (2013.01); *G06F 1/3203* (2013.01)

(58) Field of Classification Search
CPC ........ G06F 1/3287; G06F 1/24; G06F 9/4403; G06F 9/4411
USPC .......................................................... 713/323
See application file for complete search history.

(56) References Cited

U.S. PATENT DOCUMENTS

| | | | | |
|---|---|---|---|---|
| 8,447,910 B1* | 5/2013 | Yi | .......... | G06F 13/385 710/315 |
| 2002/0013884 A1* | 1/2002 | Fujioka | .................. | G06F 9/445 711/115 |
| 2002/0045435 A1* | 4/2002 | Fantaske | ............... | H04L 1/0002 455/403 |
| 2004/0125762 A1* | 7/2004 | Haller | ............... | H04L 29/12311 370/313 |
| 2005/0138377 A1* | 6/2005 | First | ...................... | G06F 21/305 713/169 |

(Continued)

FOREIGN PATENT DOCUMENTS

| | | |
|---|---|---|
| JP | 2006-157815 | 6/2006 |
| JP | 2011-151564 | 8/2011 |
| JP | 2015-76775 | 4/2015 |

*Primary Examiner* — Volvick Derose
(74) *Attorney, Agent, or Firm* — Osha Liang LLP (57) ABSTRACT

An information processing apparatus including: a communication processor; a controller that makes the communication processor be in a port opened state when the information processing apparatus is powered on; and a setting processor that sets connection information in the communication processor made into the port opened state by the controller through executing a program file to set the connection information. This configuration makes it possible to easily set communication setting information.

10 Claims, 9 Drawing Sheets

(56) References Cited

U.S. PATENT DOCUMENTS

| | | | | |
|---|---|---|---|---|
| 2006/0101278 A1* | 5/2006 | Kobayashi | G07C 9/00134 | 713/182 |
| 2006/0294222 A1* | 12/2006 | Araujo | H04L 41/0631 | 709/224 |
| 2008/0062997 A1* | 3/2008 | Nix | H04L 29/12066 | 370/395.2 |
| 2008/0208959 A1* | 8/2008 | St. John | H04L 67/02 | 709/203 |
| 2009/0319674 A1* | 12/2009 | Yahyaoui | H04L 29/12528 | 709/228 |
| 2010/0325461 A1* | 12/2010 | Sakagami | G06F 1/3203 | 713/324 |
| 2011/0019600 A1* | 1/2011 | Ping | G06F 1/3203 | 370/311 |
| 2011/0022812 A1* | 1/2011 | van der Linden | G06F 9/5077 | 711/163 |
| 2011/0090883 A1* | 4/2011 | Tanaka | G06F 1/3203 | 370/338 |
| 2011/0164511 A1* | 7/2011 | Poon | H04W 4/70 | 370/252 |
| 2011/0176456 A1* | 7/2011 | Tamura | G06F 13/122 | 370/254 |
| 2011/0185039 A1* | 7/2011 | Ueno | H04L 63/029 | 709/217 |
| 2012/0084757 A1* | 4/2012 | Tamiya | G06F 11/362 | 717/124 |
| 2012/0131594 A1* | 5/2012 | Morgan | G06F 9/5072 | 718/105 |
| 2012/0136736 A1* | 5/2012 | Edwards | G06Q 30/06 | 705/21 |
| 2012/0324439 A1* | 12/2012 | Kimura | G06F 8/61 | 717/175 |
| 2013/0222211 A1* | 8/2013 | Kubota | H04W 76/10 | 345/2.3 |
| 2013/0268751 A1* | 10/2013 | Preiss | H04M 1/72563 | 713/155 |
| 2014/0011478 A1* | 1/2014 | Collins | H04L 43/00 | 455/411 |
| 2015/0020150 A1* | 1/2015 | Hagiuda | H04L 63/20 | 726/1 |
| 2015/0026758 A1* | 1/2015 | Payyappilly | H04W 4/00 | 726/1 |
| 2015/0074278 A1* | 3/2015 | Maes | H04L 47/70 | 709/226 |
| 2015/0078288 A1* | 3/2015 | Sanyal | H04W 8/02 | 370/329 |
| 2015/0163288 A1* | 6/2015 | Maes | H04L 67/10 | 709/203 |
| 2015/0199197 A1* | 7/2015 | Maes | G06F 8/71 | 717/122 |
| 2016/0044283 A1* | 2/2016 | Vourkoutiotis | H04N 7/181 | 348/143 |
| 2016/0212620 A1* | 7/2016 | Paczkowski | H04W 12/08 | |
| 2016/0234725 A1* | 8/2016 | Paczkowski | H04W 12/02 | |
| 2016/0302132 A1* | 10/2016 | Patrikios | H04L 63/0884 | |
| 2017/0286516 A1* | 10/2017 | Horowitz | G06F 11/0709 | |
| 2018/0191858 A1* | 7/2018 | Jennequin | H04L 12/2818 | |

* cited by examiner

INFORMATION PROCESSING APPARATUS AND NON-TRANSITORY COMPUTER-READABLE RECORDING MEDIUM HAVING STORED THEREIN PROGRAM FOR SETTING CONNECTION INFORMATION

CROSS-REFERENCE TO RELATED APPLICATION

This application is based upon and claims the benefit of priority of the prior Japanese Patent application No. 2016-081349, filed on Apr. 14, 2016, the entire contents of which are incorporated herein by reference.

FIELD

The embodiments discussed herein are directed to an information processing apparatus and a non-transitory computer-readable recording medium having stored therein a program for setting connection information.

BACKGROUND

In order to make a terminal device into a connectable state to a communication line, such as Internet, various information exemplified by user names, passwords, and Access Point Name (APN) to access a server disposed on the communication line needs to be set in the terminal device. Generally, a network operator (communication carrier) sells mobile terminals being set an APN compatible with the communication carrier therein. The setting (hereinafter also called APN setting) of the APN is written into a communication module (Long Term Evolution (LTE) module) provided in the terminal device.

On the other hand, a Mobile Virtual Network Operator (MVNO) uses lines (hereinafter sometimes referred to as "carrier line") that such an above communication carrier provides, but uses servers of its own. In general, an MVNO user is provided with a terminal device in the state of not being set the APN therein.

Therefore, the MVNO user needs to set the APN in the terminal device by his/her self. Specifically, the user starts the operating system (OS) of the terminal device and writes the value of APN setting compatible with the MVNO into the communication module of the terminal device.

For example, in purchasing a large number of terminal devices, a purchaser such as a company, sometimes requests a vender to supply the terminal devices being set APN therein. If the number of terminal devices to be supplied is close to the number of production lot of the communication modules, communication modules satisfying the requested specification are produced and incorporated to the terminal device to be supplied. However, if the number of terminal device to be supplied is much less than the number of production lot, the vender needs to set APN in each individual terminal device.

In a traditional terminal device, the APN is set by starting the OS of the device and then executing the dedicated application to APN setting.
[Patent Literature 1] Japanese Laid-open Patent Publication No. 2011-151564
[Patent Literature 2] Japanese Laid-open Patent Publication No. 2006-157815
[Patent Literature 3] Japanese Laid-open Patent Publication No. 2015-76775

In traditional techniques, setting an APN by starting OS and subsequent executing an application in several terminal devices has caused no problem. However, when the number of terminal devices is increased to several dozens, it has taken considerable time and been cumbersome to start the OSs in individual terminal devices.

SUMMARY

According to an aspect of the embodiments, an information processing apparatus includes: a communication processor; a controller that makes the communication processor be in a port opened state when the information processing apparatus is powered on; and a setting processor that sets connection information in the communication processor made into the port opened state by the controller through executing a program file to set the connection information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, an information processor and a non-transitory computer-readable recording medium having stored therein a program for setting connection information according to embodiments will now be detailed with reference to accompanying drawings. The following first and second embodiments are exemplary and have no intention to exclude various modifications and applications of techniques not referred in the embodiments. In other words, various changes and modifications (e.g., a combination of the embodiments and the modifications) can be suggested without departing from the spirit of the embodiments. The drawings do not illustrate all the functions and elements included in the embodiment and may include additional functions and elements to those illustrated in the accompanying drawings.

Figure 1:
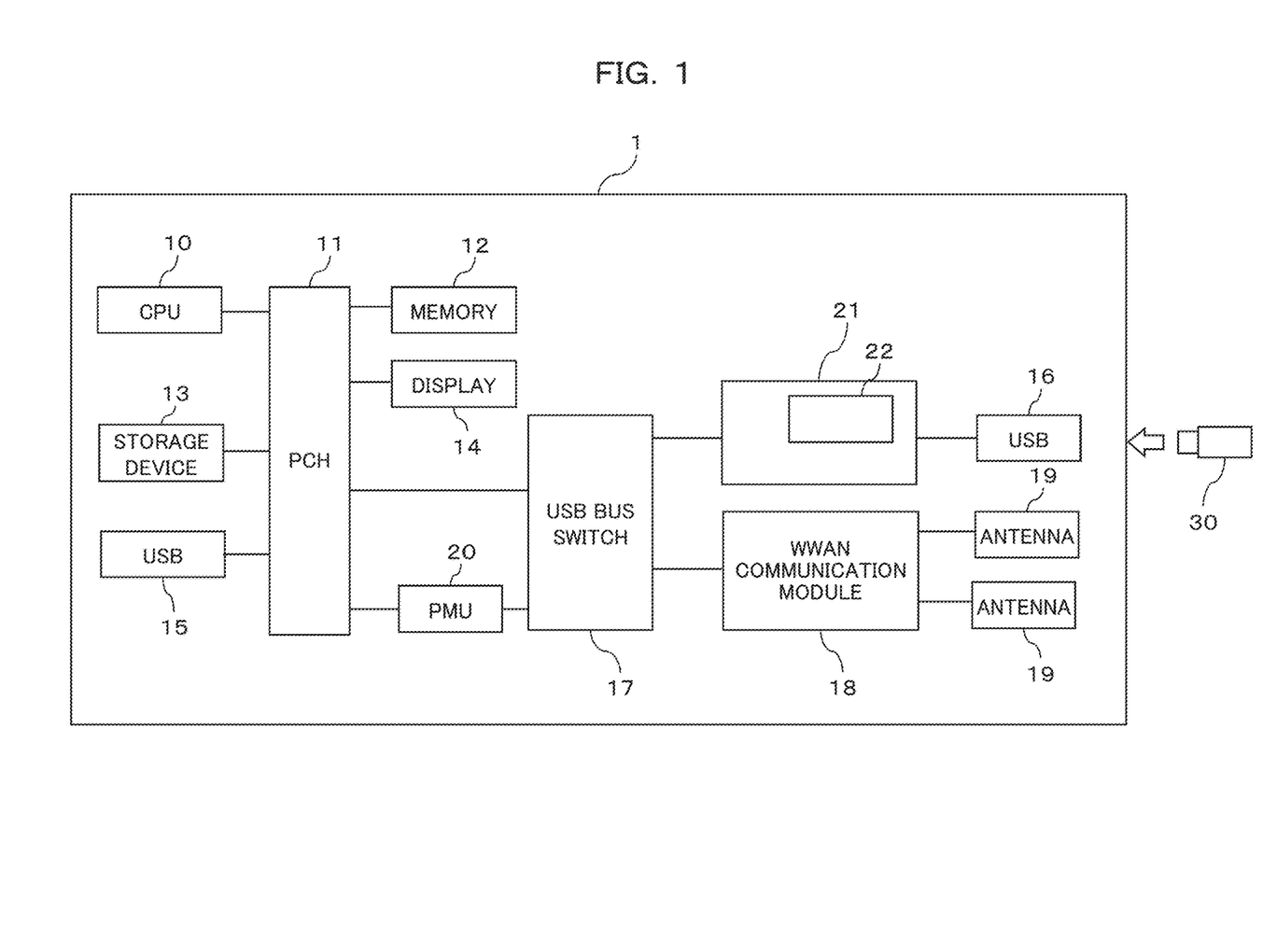
FIG. 1 is a block diagram schematically illustrating an example of the hardware configuration of a computer according to a first embodiment.

(1) First Embodiment
(1-1) Configuration:
FIG. 1 is a block diagram schematically illustrating an example of the hardware configuration of a computer 1 according to the first embodiment.

As illustrated in FIG. 1, the computer 1 includes a Central Processing Unit (CPU) 10, a Platform Controller Hub (PCH) 11, a memory 12, a storage device 13, a display 14, USB connectors 15, 16, a Universal Serial Bus (USB) bus switch 17, a Wireless Wide Area Network (WWAN) communication module 18, antennas 19, a Power Management Unit (PMU) 20, and a USB detector 21.

The PCH 11 is a processor for controlling inputting from and outputting to peripheral entities and functions as a controller hub to, for example, connect the memory 12 and the storage device 13 to the CPU 10.

The PCH 11 communicably connects the CPU 10, the memory 12, the storage device 13, the display 14, the USB connector 15, the USB bus switch 17, and the PMU 20 to one another.

The CPU 10 controls the entire computer 1. The CPU 10 may be a multiprocessor. The CPU 10 may be replaced with a Micro Processing Unit (MPU), a Digital Signal Processor (DSP), an Application Specific Integrated Circuit (ASIC), a Programmable Logic Device (PLD), or a Field Programmable Gate Array (FPGA). Alternatively, the CPU 11 may be a combination containing at least two of a CPU, an MPU, a DSP, an ASIC, a PLD, and an FPGA.

The storage device 13 stores various data and is exemplified by a Hard disk drive (HDD), a Solid State Drive (SSD), and a Storage Class Memory (SCM).

The memory 12 is a storing memory including a Read Only Memory (ROM) and a Random Access Memory (RAM). In the ROM of the memory 12, a software program related to controlling of APN setting and the data for the program are written. Such a software program in the memory 12 is appropriately read and executed by the CPU 10. The RAM of the memory 12 is used as a primary storing memory or a working memory.

The display 14 displays thereon various pieces of information under the control of a non-illustrated display controller, and is exemplified by an LCD and a Cathode Ray Tube (CRT) display.

The USB connectors 15, 16 each function to connect a USB device to the computer 1. The USB connector 15 is directly connected to the PCH 11. The USB connector 16 is connected to the PCH 11 via the USB detector 21 and the USB bus switch 17.

In the first embodiment, a USB memory 30 is connected to the USB connector 16.

Figure 2:
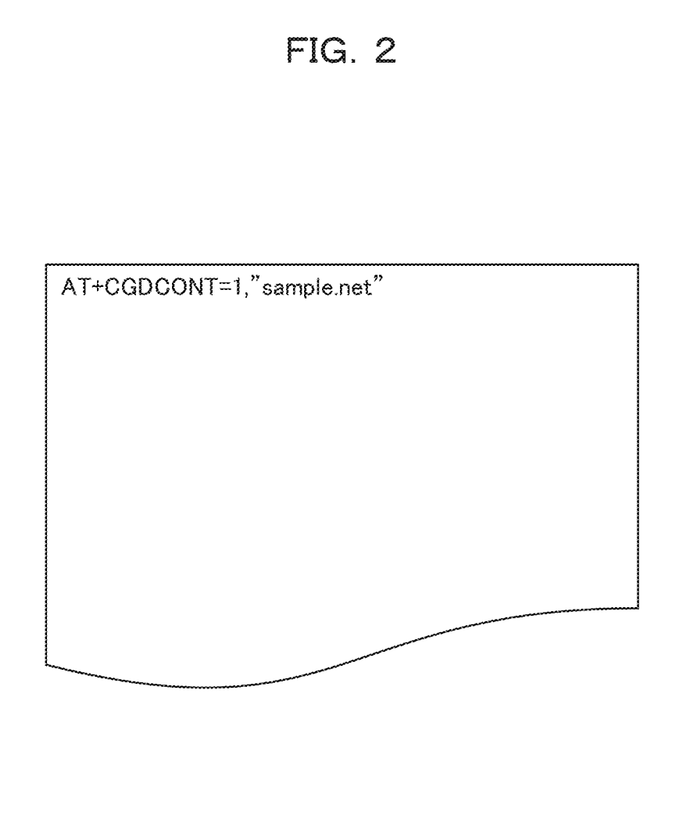
FIG. 2 is a diagram illustrating a script stored in a USB memory to be connected to a computer of FIG. 1 of the first embodiment.

FIG. 2 is a diagram illustrating an example of a script stored in the USB memory 30 to be connected to the computer 1 of the first embodiment.

The script denoted in FIG. 2 is set (stored) in the USB memory 30 connected to the USB connector 16.

The script stored in the USB connector 16 is a file (program file, program data) describing a command (APN setting information, setting information, setting file information) to set an APN in the computer 1 (WWAN communication module 18). In other words, the script is the program file to set an APN in the WWAN communication module 18.

An APN is set in the WWAN communication module 18 by the MPU 201 (writing processor 214) of the PMU 20 executing this script as an AT command.

A unique device ID is set in the USB memory 30 in advance, and is stored in a non-illustrated storing region of the USB memory 30. The USB memory 30 is specified by referring to the device ID.

The USB bus switch 17 switches the connection state of the USB bus. The USB bus switch 17 switches the connection destination of the WWAN communication module 18 under the control of, for example, the PMU 20 (connection switching controller 211) that is to be detailed below.

For example, the USB bus switch 17 sets a first connection state (first connection mode) in which the WWAN communication module 18 is connected to the PCH 11, and also sets a second connection state (second connection mode) in which the WWAN communication module 18 is connected to the PMU 20. The USB bus switch 17 switches between the first connection state and the second connection state.

In the second connections state, the USB bus switch 17 connects the USB memory 30, which is connected to the USB connector 16, to the WWAN communication module 18.

The USB detector 21 detects a connection of a USB device to the USB connector 16, and is interposed between the USB bus switch 17 and the USB connector 16.

The USB detector 21 includes a USB detecting register 22. When a USB device is connected to the USB connector 16, the USB detector 21 reads the device ID of the connected USB device and stores the device ID in the USB detecting register 22.

In the first embodiment, the device ID of the USB memory 30, which stores therein the script described above, is stored in, for example, a non-illustrated storing region of the computer 1 as a reference device ID. The USB detector 21 compares the device ID read from the USB device (e.g., USB memory 30) connected to the USB connector 16 and stored in the USB detecting register 22 with the reference device ID.

If the device ID read from the USB device matches the reference device ID, the USB detector 21 determines that the USB device connected to the USB connector 16 is a special USB memory 30 (hereinafter sometimes referred to as an APN-setting USB memory 30) that stores the setting file information. Here, the APN-setting USB memory 30 (USB memory 30) functions as a first recording medium having stored the script.

Namely, the USB detector 21 achieves the function as a detector that detects the connection of an APN-setting USB memory 30 that stores therein an APN setting information to the computer 1.

When the APN-setting USB memory 30 is connected to the USB connector 16, the USB detector 21 asserts a particular signal (USB signal) that notifies the connection of the USB memory 30.

The WWAN communication module 18 is a communication device (communication processor) that wirelessly communicates with a non-illustrated bas e station. An example of the WWAN communication module 18 is an LTE module.

To the WWAN communication module 18, one or more (two in the example illustrated in FIG. 1) antennas 19 are connected.

The WWAN communication module 18 includes a non-illustrated memory, and the setting value of the APN is stored in the memory.

The WWAN communication module 18 included in the computer 1 of the first embodiment conforms to the specification to operate in Windows® 7 mode in a predetermined time period since the computer 1 has been powered on (started).

In Windows® 7 mode, a COM port of the WWAN communication module 18 is in the open state (port opening state), so that data (APN) can be written into the internal memory of the WWAN communication module 18 from the exterior of the WWAN communication module 18.

When the WWAN communication module 18 is forcibly reset by receiving a reset signal from an external device (e.g., the PMU 20) of the WWAN communication module 18, the WWAN communication module 18 is restarted and therefore the internal power source is temporarily turned off and then turned on. Thereby, the WWAN communication module 18 operates in Window® 7 mode for the predetermined time period since the WWAN communication module 18 has been reset. As described above, the COM port of the WWAN communication module 18 comes to be in the open state in Windows® 7 mode. The COM port coming into the open state may be also referred to as the COM port being opened or the COM port being enabled.

The PMU 20 controls power supply to each device included in the computer 1.

Figure 3:
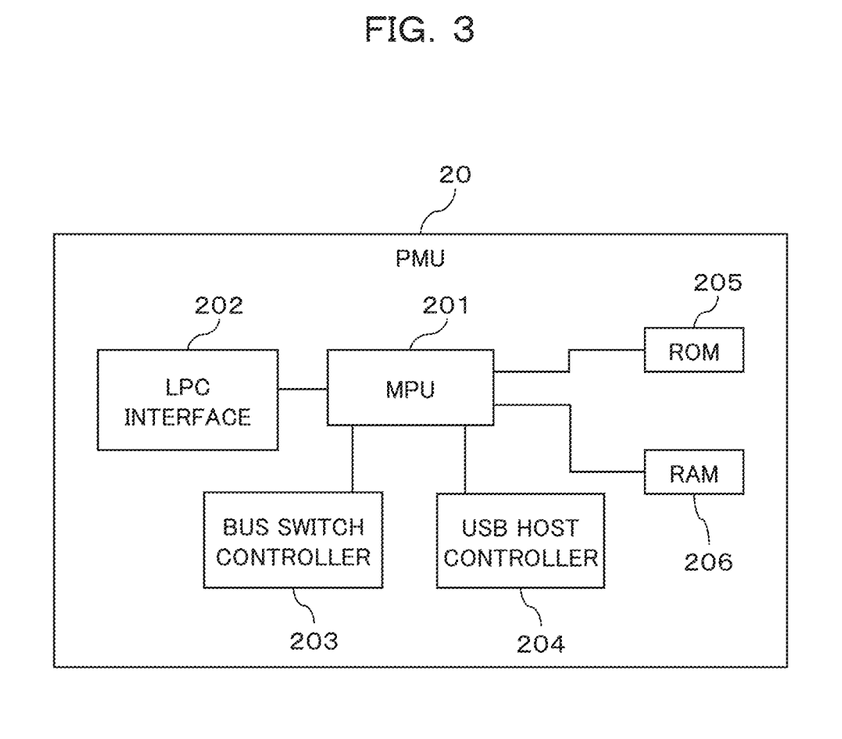
FIG. 3 is a block diagram schematically illustrating an example of the hardware configuration of a PMU of the computer of FIG. 1 of the first embodiment.

FIG. 3 is a block diagram schematically illustrating the hardware configuration of the PMU 20 of the computer 1 of the first embodiment.

As illustrated in FIG. 2, the PMU 20 includes a Micro Processing Unit (MPU) 201, a Low Pin Count (LPC) interface 202, the BUS switch controller 203, the USB host controller 204, a ROM 205, and a RAM 206.

The LPC interface 202 is a bus interface that connects semiconductor devices to each other, and communicates with, for example, the PCH 11.

The BUS switch controller 203 controls the switching of the USB bus switch 17 under the control of the connection switching controller 211 that is to be detailed below. The PMU 20 controls the switching of the USB bus switch 17 via the BUS switch controller 203.

For example, the BUS switch controller 203 causes the USB bus switch 17 to switch between the first connection state in which the WWAN communication module 18 is connected to the PCH 11 and the second connection state in which the WWAN communication module 18 is connected to the PMU 20 by sending a switch controlling signal to the USB bus switch 17.

The USB host controller 204 controls a USB device coupled to the USB connector 16. For example, the USB host controller 204 reads a script described above from the USB memory 30 connected to the USB connector 16.

In the ROM 205, the software program (connection information setting program) related to controlling of APN setting by the PMU 20 and various pieces of data for this program are written. The software program is appropriately read and executed by the MPU 201. The RAM 206 is used as a primary storing medium and a working memory.

The MPU 201 is a processor that carries out various controls and calculations, and achieves various functions by executing a program stored in the ROM 205 and the RAM 206.

Figure 4:
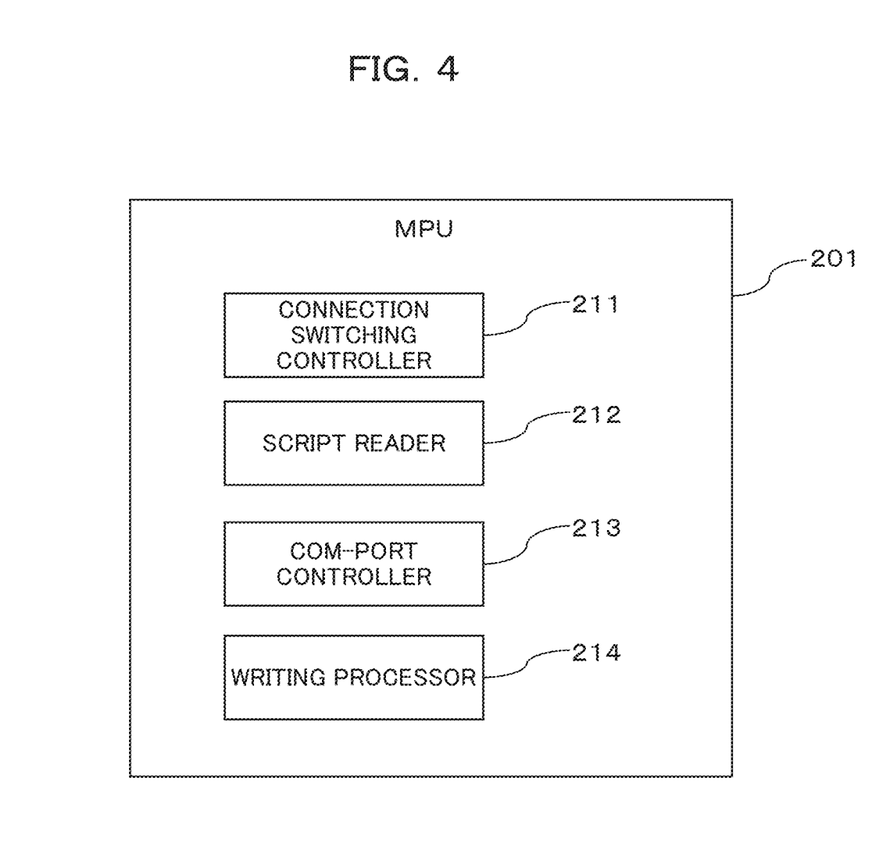
FIG. 4 is a block diagram schematically illustrating an example of the functional configuration of the computer of FIG. 1 of the first embodiment.

The MPU 201 functions as a connection switching controller 211, a script reader 212, a communication (COM)-port controller 213, and a writing processor 214 of FIG. 4 by executing the APN setting program (connection information setting program).

FIG. 4 is a block diagram schematically illustrating an example of the functional configuration of the computer 1 of the first embodiment.

The program (program for controlling of APN setting) to achieve the function of the connection switching controller 211, the script reader 212, the COM-port controller 213, and the writing processor 214 is provided in the form of being stored in a non-transitory computer-readable recording medium such as a flexible disk, a CD (e.g., CD-ROM, CD-R, and CD-RW), a DVD (e.g., DVD-ROM, DVD-RAM, DVD-R, DVD+R, DVD-RW, DVD+RW, and HD DVD), a Blu-ray disk, a magnetic disk, an optical disk, and a magneto-optical disk. The computer reads the program from the recording medium and forwards the read program to an internal memory device or an external memory device, which stores the program for future use. Alternatively, the program may be stored in, for example, a memory device (recording medium) such as a magnetic disk, an optical disk, and a magneto-optical disk, and may be provided from the memory device to the computer through a communication path.

In achieving the function as the function of the connection switching controller 211, the script reader 212, the communication (COM)-port controller 213, and the writing processor 214, the program stored in the internal memory device (in this embodiment, the RAM 206 or the ROM 205) is executed by the microprocessor (in this embodiment, the MPU 201) of the computer. Alternatively, the computer may read the program from a recording medium and then execute the read program.

The connection switching controller 211 switches the connection destination of the WWAN communication module 18 by controlling the USB bus switch 17.

Specifically, the connection switching controller 211 controls the USB bus switch 17 in order to switch between the first connection state (first connection mode) in which the WWAN communication module 18 is connected to the PCH 11, and the second connection state (second connection mode) in which the WWAN communication module 18 is connected to the PMU 20.

For example, in cases where the USB memory 30 is connected to the USB connector 16 when the computer 1 is powered on (started), the connection switching controller 211 controls the USB bus switch 17 to switch from the first connection state to the second connection state.

This means that the connection switching controller 211 switches from the first connection state in which the WWAN communication module 18 is connected to the PCH 11 to the second connection state in which the WWAN communication module 18 is connected to the PMU 20.

As described above, in cases where the USB memory 30 (first recording medium) is connected to the USB connector 16 when the computer 1 is powered on, the connection switching controller 211 functions as a connection switching controller that connects the WWAN communication module 18 to the PMU 20.

Furthermore, under the second connection state, the connection switching controller 211 connects the WWAN communication module 18 and the USB memory 30, which is connected to the USB connector 16, by controlling the USB bus switch 17.

The COM-port controller 213 controls opening of the COM port of the WWAN communication module 18.

The COM-port controller 213 opens the COM port of the WWAN communication module 18 so that the writing processor 214 that is to be detailed below can write the APN into the WWAN communication module 18.

Specifically, the COM-port controller 213 transmits a reset signal to the WWAN communication module 18. Thereby, the WWAN communication module 18 is restarted and the COM port thereof is opened for a predetermined time period since the restarting during which the writing process or 214 can write the APN into the WWAN communication module 18.

Accordingly, the COM-port controller 213 functions as a controller that makes the WWAN communication module 18 to be in the port opening state when the computer 1 is powered on.

In cases where the WWAN communication module 18 detects no access to the COM port being in the port opening state for a predetermined time period, the COM port is made into the closed state.

Alternatively, the COM-port controller 213 may close the COM port after the writing processor 214 finishes to write the APN into the WWAN communication module 18. The COM port can be closed by any known manners, detailed description of which is omitted here.

The script reader 212 reads the script from the USB memory 30 connected to the USB connector 16.

The script reader 212 functions as a reader that reads, in cases where the USB memory (first recording medium) 30 is connected to the USB connector 16 when the computer 1 is powered on, a script from the USB memory 30.

The writing processor 214 writes the APN into a non-illustrated memory of the WWAN communication module 18 by executing, as an AT command, the script that the script reader 212 has read from the USB memory 30.

In other words, the writing processor 214 functions as a setting processor that sets the APN into the WWAN communication module 18 that the COM-port controller 213 has made to be in the port opening state by executing the script to set the APN (connection information).

Figure 5:
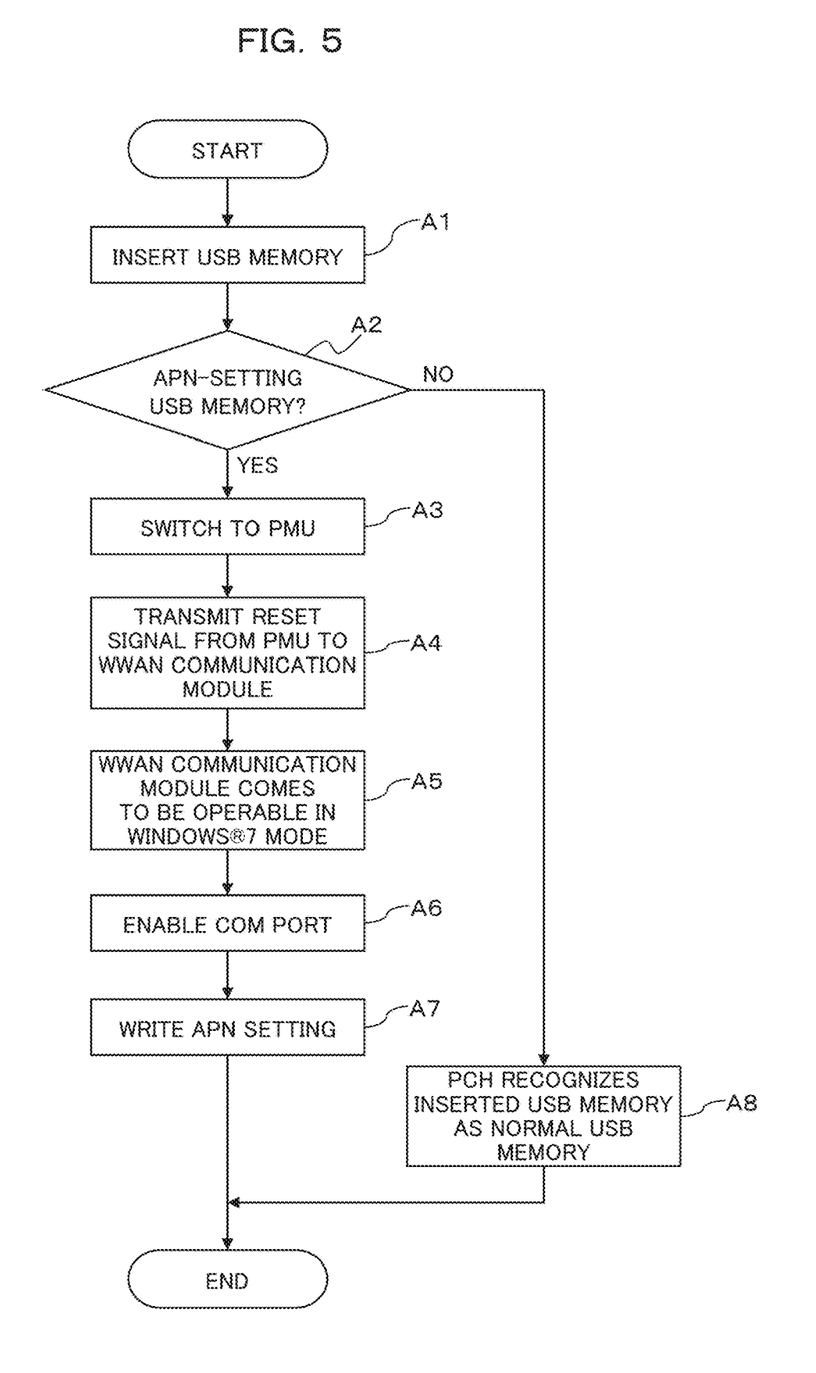
FIG. 5 is a flow diagram denoting a succession of procedural steps of setting an APN in the computer of FIG. 1 of the first embodiment.

(1-2) Operation:

Description will now be made in relation to a process of setting the APN in the computer 1 of the first embodiment having the above-described configuration along the flow diagram (steps A1-A8) of FIG. 5.

In step A1, the operator (hereinafter simply referred to "operator") that sets the APN in the computer 1 inserts and places the USB memory 30 into the USB connector 16 of the computer 1 being in the power-off state and then powers on the computer 1.

In step A2, the USB detector 21 compares the device ID of the USB memory 30 placed in the USB connector 16 with the reference device ID to determine whether the placed USB memory 30 is an APN-setting USB memory 30.

As a result of the determination, if the placed USB memory 30 is not the APN-setting USB memory 30 (see NO route in step A2), the PCH 11 recognizes the placed USB memory 30 as a normal USB memory 30 in step A8. Specifically, the USB memory 30 connected to the USB connector 16 is regarded as a normal recording medium and the process finishes.

In contrast, as a result of the determination, if the placed USB memory 30 is the APN-setting USB memory 30 (see YES route in step A2), the process moves to step A3.

In step A3, the connection switching controller 211 switches a connection state to the second connection state (second connection mode) in which the WWAN communication module 18 is connected to the PMU 20.

In step A4, the COM-port controller 213 of the PMU 20 transmits a reset signal to the WWAN communication module 18. This resets the WWAN communication module 18 so that the internal power source of the WWAN communication module 18 is temporarily turned off and then turned on. The WWAN communication module 18 is enabled in the Windows® 7 mode (step A5).

The COM port of the WWAN communication module 18 in the Windows® 7 mode is enabled (opened state) (step A6).

In step A7, the writing processor 214 writes the APN into the WWAN communication module 18 and then the process of setting the APN is finished. After the APN is set, the computer 1 may be powered off.

Figure 6:
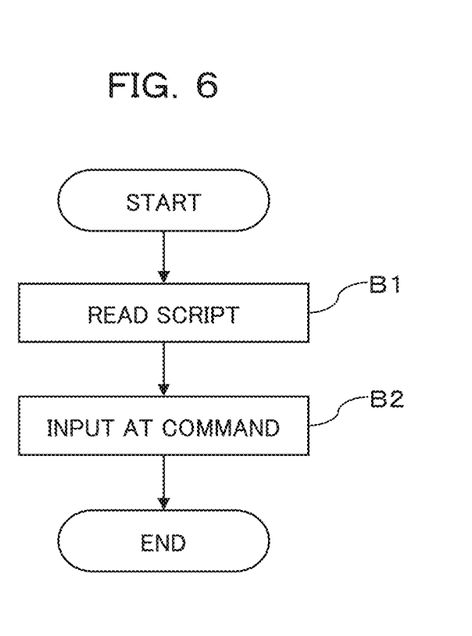
FIG. 6 is a flow diagram denoting a succession of procedural steps of setting an APN into a WWAN communication module by a writing processor of the computer of FIG. 1 of the first embodiment.

FIG. 6 is a flow diagram (steps B1 and B2) denoting a succession of procedural steps of writing an APN into the WWAN communication module 18 by the writing processor 214 in the computer 1 of the first embodiment.

In step B1, the writing processor 214 reads the script stored in the APN-setting USB memory 30.

In step B2, the writing processor 214 executes (inputs), as the AT command, the script obtained in step B1, so that the APN is set in the memory of the WWAN communication module 18.

After that, the WWAN communication module 18 detects that the COM port has not been accessed for a predetermined time period, the COM port is disabled, which means that the COM port is shifted into the closed state.

The connection switching controller 211 switches the connection state to the first connection state in which the WWAN communication module 18 is connected to the PCH 11. This completes the process of writing the APN into the WWAN communication module 18.

(1-3) Effects:

In the computer 1 of the first embodiment, the APN is automatically set in the WWAN communication module 18 when the operator starts the computer 1 under the state where the APN-setting USB memory 30 is connected to the USB connector 16. This setting manner is highly convenient.

Specifically, the connection switching controller 211 switches the connection state into the second connection state (second connection mode) in which the WWAN communication module 18 is connected to the PMU 20 and the COM-port controller 213 sets the COM port of the WWAN communication module 18 to the opened state.

The setting value of the APN is stored in the memory of the WWAN communication module 18 by the writing processor 214 executing script that the script reader 212 has read from the USB memory 30.

For this purpose, the computer 1 can set the APN in the WWAN communication module 18 without starting the OS. This can reduce the time for setting the APN.

(2) Second Embodiment (2-1) Configuration:

In the computer 1 of the second embodiment, the function of the Basic Input Output System (BIOS) sets the APN in the WWAN communication module 18 in place of the USB memory 30 and the PMU 20 of the first embodiment.

The computer 1 of the second embodiment has the same hardware configuration as the computer 1 of the first embodiment.

Like the WWAN communication module 18 of the first embodiment, the WWAN communication module 18 included in the computer 1 of the second embodiment is designed to the specification to operate in Windows® 7 mode in a predetermined time period since the computer 1 has been started.

Figure 7:
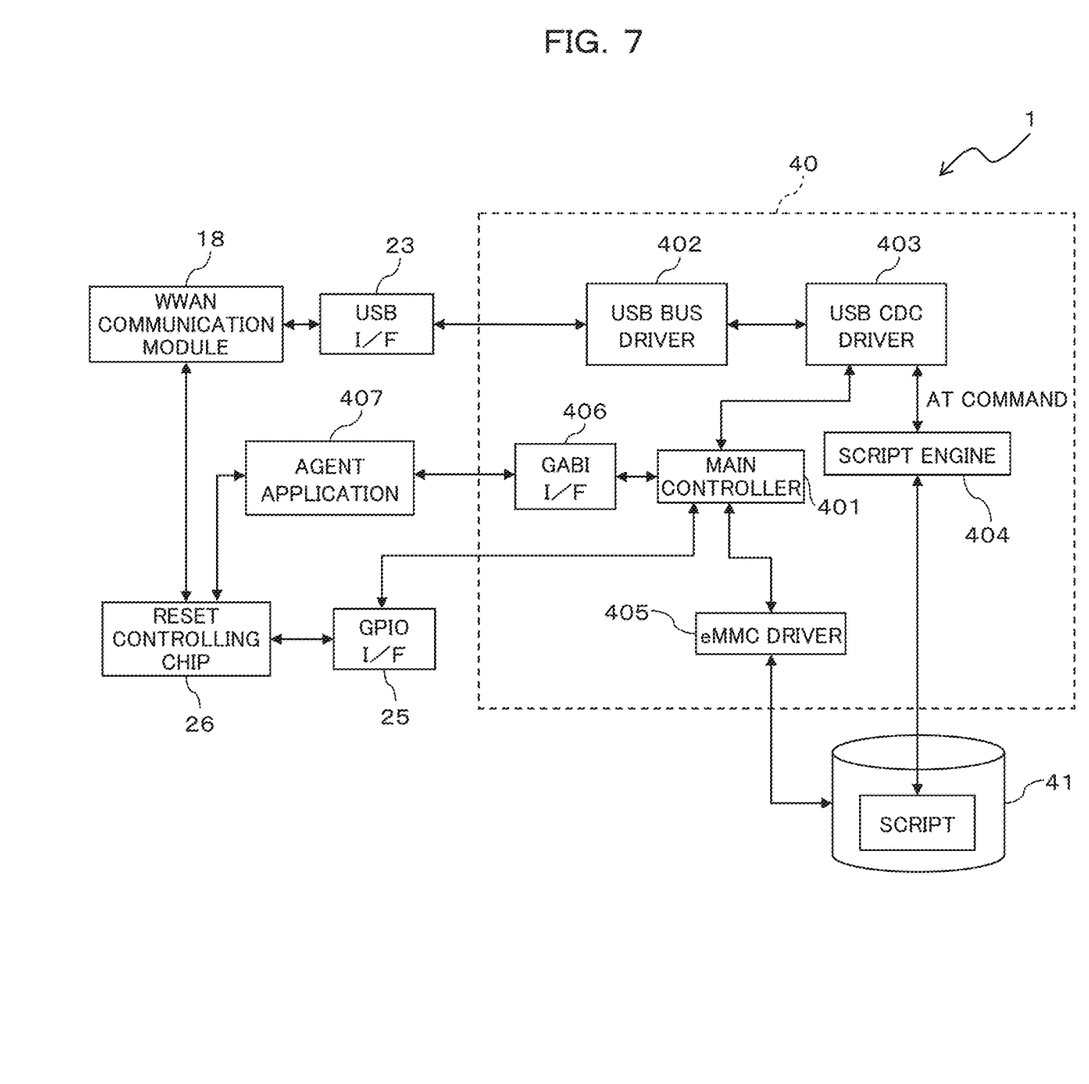
FIG. 7 is a block diagram schematically illustrating a functional configuration of the BIOS of a computer according to a second embodiment.

FIG. 7 is a block diagram schematically illustrating the example of the functional configuration of the BIOS.

The computer 1 of FIG. 7 includes the WWAN communication module 18, a reset controlling chip 26, a USB interface (I/F) 23, a General Purpose Input/Output (GPIO) interface 25, an Embedded Multi Media Card (eMMC) 41, a main controller 401, a USB bus driver 402, a USB Communication Device Class (CDC) driver 403, a script engine 404, an eMMC driver 405, a Global Application BIOS Interface (GABI) interface 406, and an agent application 407.

The functions of the main controller 401, the USB bus driver 402, the USB CDC driver 403, the script engine 404, the eMMC driver 405, and the GABI interface 406 are achieved by the CPU 10 (see FIG. 1) provided with the computer 1 executing the connection information setting program.

The connection information setting program is incorporated as a module of the BIOS 40. This means that the functions of the main controller 401, the USB bus driver 402, the USB CDC driver 403, the script engine 404, the eMMC driver 405, and the GABI interface 406 are achieved as the function of the BIOS 40.

In accompanying drawings, like reference numbers designate the same or substantially the same parts and elements, so repetitious description is omitted here.

The reset controlling chip 26 is a control circuit device that resets the WWAN communication module 18 by controlling the WWAN communication module 18 to be powered off. An example of the reset controlling chip 26 is a CLEARSUREChip.

The reset controlling chip 26 resets the WWAN communication module 18 under the control that the main controller 401 makes via the GPIO interface 25.

The WWAN communication module 18 when being made in the power-off state by the reset controlling chip 26 comes to be in the powered-on state when the main controller 401 restarts (reboots) the computer 1, so that the WWAN communication module 18 is restarted. In the WWAN communication module 18, the COM port is opened for a predetermined time period since the WWAN communication module 18 has been restarted, so that the APN can be written into the WWAN communication module 18.

In the computer 1 of the second embodiment, the main controller 401 resets the WWAN communication module 18 and reboots the computer 1, using the reset controlling chip 26, and thereby controls the opening of the COM port of the WWAN communication module 18.

The GPIO interface 25 is a general-purpose Input/Output interface.

The USB interface 23 is an interface for a USB bus. The WWAN communication module 18 is connected to the CPU 10 (PCH 11) via the USB interface 23.

The eMMC driver 405 is a driver that reads and writes data by controlling the eMMC 41.

The USB bus driver 402 is a driver that controls a device, such as the WWAN communication module 18, that is connected to the BIOS 40 via the USB interface 23.

The USB CDC driver 403 achieves communication with a device (WWAN communication module 18) connected to the USB interface 23 in conformity to the specification of the USB CDC.

The eMMC 41 is a semiconductor storage device and stores therein the script (APN setting information, setting information) associated with a MVNO like the APN-setting USB memory 30 of the first embodiment. In the second embodiment, multiple pieces of APN setting information (scripts) associated one with each of multiple MVNOs are stored in the eMMC 41.

Accordingly, the eMMC 41 functions as a second recording medium that stores multiple scripts associated with the respective types of APNs.

The script engine 404 actives a script stored in the eMMC 41.

The GABI interface 406 is a BIOS interface driver, and incorporates, executes, and then deletes the script through the agent application 407.

The agent application 407 operates on the OS, and has a function of setting and cancelling the reset controlling chip 26. The CPU 10 executing the agent application 407 achieves the above functions.

The GABI interface 406 sets and cancels the reset controlling chip 26 via agent application 407 operating on the OS after the OS of the computer 1 is started.

This means that the APN can be set also by executing an application dedicated to setting an APN after the OS is started in the computer 1 of the second embodiment.

The main controller 401 carries out various controls to achieve the function as the BIOS 40. The main controller 401 carries out various controls to achieve APN setting.

The main controller 401 controls opening of the COM port of the WWAN communication module 18. Specifically, the main controller 401 opens the COM port of the WWAN communication module 18 so that APN can be written into the WWAN communication module 18.

Specifically, the main controller 401 causes the reset controlling chip 26 via the GPIO interface 25 to power off the WWAN communication module 18 and then restarts the computer 1.

Thereby, the WWAN communication module 18 is restarted and the COM port is opened for a predetermined time period since the WWAN communication module 18 has been restarted, so that the APN can be written into the WWAN communication module 18.

The main controller 401 achieves the same functions as those obtained by the COM-port controller 213 of the first embodiment. Generally, simply restarting the computer 1 does not power off the WWAN communication module 18. The computer 1 of the second embodiment powers off the WWAN communication module 18 by the main controller 401 instructing the reset controlling chip 26 to power off the WWAN communication module 18.

The main controller 401 causes the script engine 404 via the USB CDC driver 403 to execute, as an AT command, a script stored in the eMMC 41. Consequently, the APN is written into a non-illustrated memory of the WWAN communication module 18 through the USB CDC driver 403, the USB bus driver 402, and the USB interface 23.

As the above, the main controller 401 achieves the same functions as those achieved by the writing processor 214 of the first embodiment.

In the second embodiment, the eMMC 41 stores multiple scripts for setting APNs, the scripts being associated one with each of the MVNOs.

Figure 8:
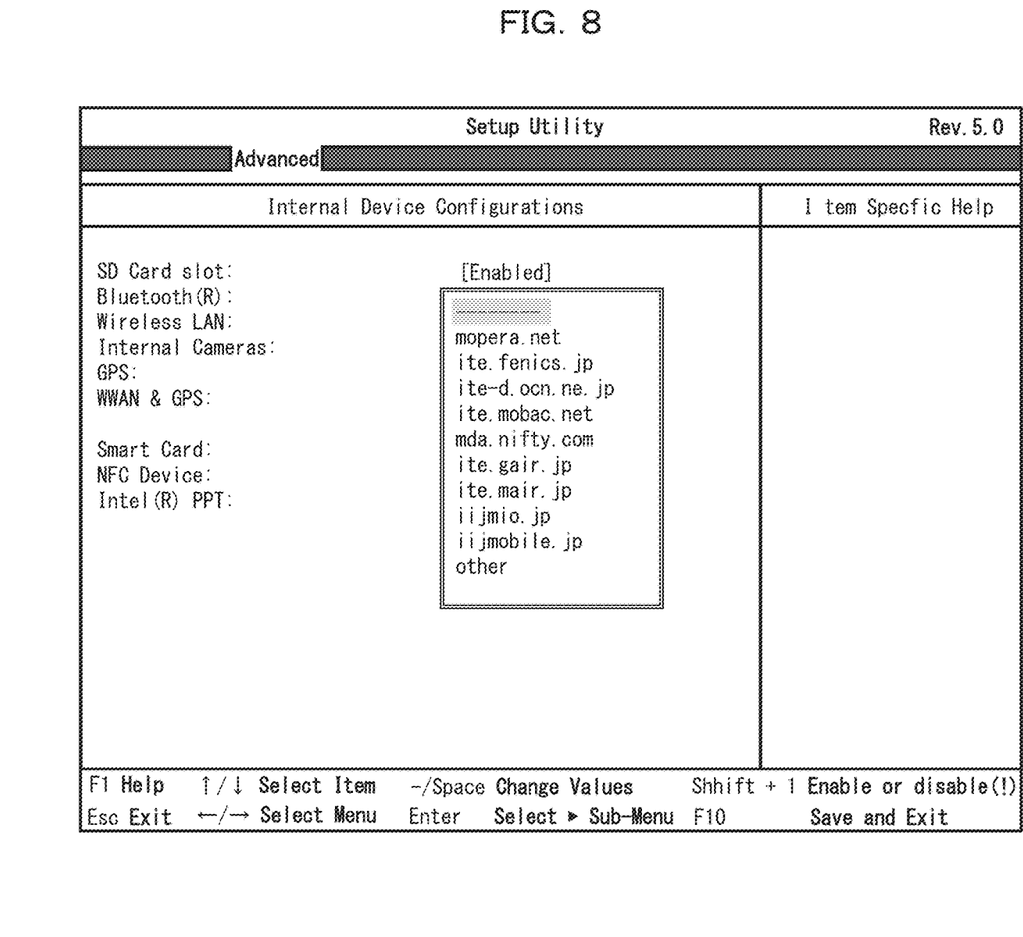
FIG. 8 is a diagram illustrating a BIOS menu displayed on a computer for selecting an APN of the second embodiment.

FIG. 8 is a diagram illustrating an example of a BIOS menu for selecting an APN displayed on the computer 1 of the second embodiment.

The BIOS menu of FIG. 8 is an input screen on which the operator selects a WWAN APN. As illustrated in FIG. 8, the main controller 401 displays, on the display 14, a selection screen (BIOS menu) that contains, as alternatives, multiple candidates for a MVNO (APN) and let the operator select one of the candidates.

The main controller 401 selects a script associated with the MVNO selected by the operator from the BIOS menu and causes the script engine 404 to execute the selected script.

The BIOS 40 is provided in the form of being stored in a non-transitory computer-readable recording medium such as a flexible disk, a CD (e.g., CD-ROM, CD-R, and CD-RW), a DVD (e.g., DVD-ROM, DVD-RAM, DVD-R, DVD+R, DVD-RW, DVD+RW, and HD DVD), a Blu-ray disk, a magnetic disk, an optical disk, and a magneto-optical disk. The computer reads the program from the recording medium and forwards the read program to an internal memory device or an external memory device, which stores the program for future use. Alternatively, the program may be stored in, for example, a memory device (recording medium) such as a magnetic disk, an optical disk, and a magneto-optical disk, and may be provided from the memory device to the computer through a communication path.

In achieving the function as the BIOS 40, the program stored in the internal memory device (in this embodiment, the memory 12) is executed by the microprocessor (in this embodiment, the CPU 10) of the computer. Alternatively, the computer may read the program from a recording medium and then execute the read program.

Figure 9:
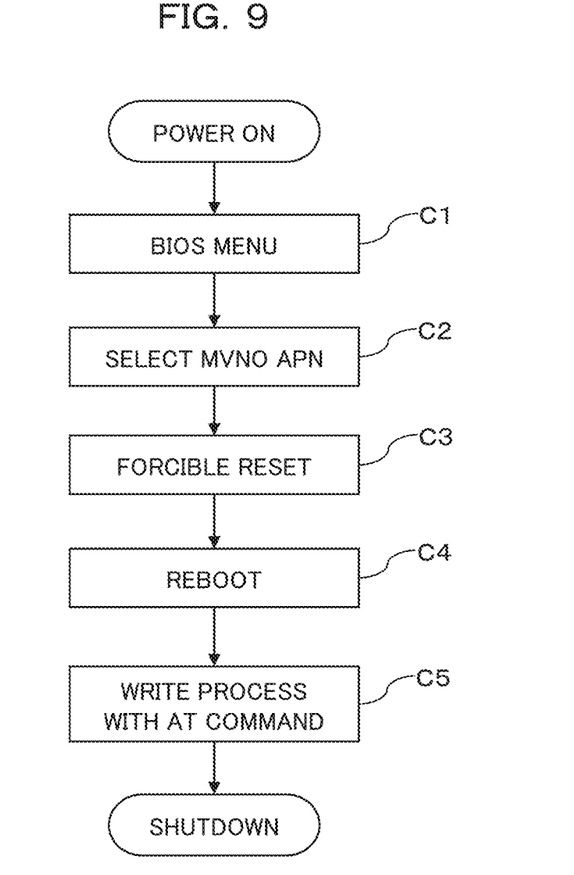
FIG. 9 is a flow diagram denoting a succession of procedural steps of setting an APN in the computer of the second embodiment.

(2-2) Operation:

Descriptions will now be made in relation to a process of setting the APN in the computer 1 of the second embodiment having the above-described configuration along the flow diagram (steps C1-C5) of FIG. 9.

For example, the BIOS setting screen on the display 14 by the operator making an operation, such as holding down a particular key, when the computer 1 is being started.

The main controller 401 displays, on the BIOS setting screen, the BIOS menu (see FIG. 8) to select the APN (MVNO) to be set in the computer 1 (step C1).

The operator selects the MVNO to be used, i.e., the APN to be set, from the BIOS menu with a non-illustrated input device such as a keyboard (step C2).

The main controller 401 instructs the reset controlling chip 26 via the GPIO interface 25 to power off the WWAN communication module 18. In responce to the powering-off instruction from the main controller 401, the reset controlling chip 26 forcibly resets the WWAN communication module 18 by controlling to power off the WWAN communication module 18 (step C3).

Thereafter that, the main controller 401 restarts the computer 1 (step C4). This restarts the WWAN communication module 18 and the COM port is opened for a predetermined time period since the WWAN communication module 18 has been restarted, so that the APN can be written into the WWAN communication module 18.

The main controller 401 causes the script engine 404 to execute, as an AT command, a script being associated with the APN that the user has selected on the BIOS menu and being one of the multiple scripts stored in the eMMC 41. This writes the APN into the non-illustrated memory of the WWAN communication module 18 (step C5).

Thereafter, the WWAN communication module 18 detects no access to the COM port for a predetermined time period, and the COM port is disabled, which means that the COM port is shifted into the closed state.

Then the main controller 401 shuts down the computer 1.

(2-3) Effects:

In the computer 1 of the second embodiment, the APN is automatically set in the WWAN communication module 18 simply when the operator selects an APN of the MVNO that the operator wishes to set on the BIOS menu. This setting manner is highly convenient.

Specifically, the main controller 401 causes the reset controlling chip 26 via the GPIO interface 25 to power off the WWAN communication module 18 and then restarts the computer 1, so that the COM port of the WWAN communication module 18 is set to be the opened state.

Then the main controller 401 causes the script engine 404 to execute, as an AT command, a script being associated with the APN that the user has selected on the BIOS menu and being one of the multiple scripts stored in the eMMC 41. Consequently, the setting value of the APN is set in the memory of the WWAN communication module 18.

For this purpose, the computer 1 can set the APN in the WWAN communication module 18 without starting the OS.

This can reduce the time for setting the APN.

(3) Others

The technique disclosed herein is not limited to the foregoing embodiments, and various changes and modifications can be suggested without departing from the gist of the embodiments. Each configuration and each step of the embodiments can be appropriately selected, omitted, or combined.

For example, in the first embodiment, the script is stored in the USB memory 30 and the script reader 212 reads the script from the USB memory 30. However, the first embodiment is not limited to this and can be variously modified. Alternatively, a storage device (storage device for setting the APN) such as a HDD, an SSD, or an SCM that stores a script to set the APN may be connected to the USB connector 16 of the computer 1 and the script reader 212 may read the script from this storage device.

Those ordinary skilled in the art can carry out and produce the foregoing embodiments with reference to the above disclosure.

According to the information processor described above can easily set communication setting information in the communication processor.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
a communication processor in which connection information to access a server of a network operator on a communication line is to be set to allow the information processing apparatus to connect to the communication line, and that includes a port, the communication processor allowing the connection information to be set in the communication processor when the communication processor is in a port opened state where the port is opened;
an operating system (OS);
a controller that makes the communication processor be in the port opened state without starting the OS when the information processing apparatus is powered on;
a setting processor that sets the connection information in the communication processor made into the port opened state without starting the OS by the controller through executing a program file to set the connection information;

a connector that is able to connect thereto a first recording medium that stores therein the program file; and a reader that reads, when the first recording medium is connected to the connector at powering on the information processing apparatus, the program file from the first recording medium, wherein the setting processor executes the program file read by the reader.

2. The information processing apparatus according to claim 1, further comprising a connection switching controller that connects, when the first recording medium is connected to the connector at powering on the information processing apparatus, the communication processor to a power-source controller, wherein the power-source controller has functions as the controller, the setting processor, the reader, and the connection switching controller.

3. The information processing apparatus according to claim 1, further comprising a second recording medium that stores therein a plurality of the program files associated one with a plurality of pieces of the connection information, wherein the setting processor executes, in a start process performed after the information processing apparatus is powered on, one of the plurality of program files being stored in the second recording medium and being associated with selected one of the plurality of pieces of the connection information.

4. The information processing apparatus according to claim 3, further comprising a control circuit device that powers off the communication processor, wherein the controller restarts the information processing apparatus after the controller causes the control circuit device to power off the communication processor.

5. The information processing apparatus according to claim 1, wherein the connection information is information on an Access Point Name (APN).

6. The information processing apparatus according to claim 1, wherein when the communication processor detects no access to the port being opened for a predetermined time period, the communication processor closes the port.

7. A non-transitory computer-readable recording medium having stored therein a program for setting connection information that causes a processor, being included in an information processing apparatus including a communication processor in which connection information to access a server of a network operator on a communication line is to be set to allow the information processing apparatus to connect to the communication line, and an operating system (OS), to execute a process comprising:

causing the communication processor to be in a port opened state where a port of the communication processor is opened, without starting the OS when the information processing apparatus is powered on, the communication processor allowing the connection information to be set in the communication processor when the port is opened;

setting the connection information in the communication processor made into the port opened state without starting the OS by executing a program file to set the connection information;

reading, when a first recording medium storing therein the program file is connected to a connector, being able to connect thereto the first recording medium, at powering on the information processing apparatus, the program file from the first recording medium; and executing the read program file.

8. The non-transitory computer-readable recording medium according to claim 7, wherein the program causes the processor to further execute: when the first recording medium is connected to the connector at powering on the information processing apparatus, connect the communication processor to a power-source controller.

9. The non-transitory computer-readable recording medium according to claim 7, wherein the program causes the processor to further execute: in a start process performed after the information processing apparatus is powered on, execute a program file associated with selected one of a plurality of pieces of the connection information, the program file being stored in a second recording medium that stores therein a plurality of the program files associated one with a plurality of pieces of the connection information.

10. The non-transitory computer-readable recording medium according to claim 9, wherein the program causes the processor to further execute:

restart the information processing apparatus after the processor causes a control circuit device that powers off the communication processor to power off the communication processor.

* * * * *